United States Patent [19] [11] 4,380,502
Müller et al. [45] Apr. 19, 1983

[54] PROCESS FOR THE PRODUCTION OF POLYETHER POLYOLS

[75] Inventors: Hanns P. Müller, Odenthal, Fed. Rep. of Germany; Claus-Dieter Sommerfeld, Pittsburgh, Pa.; Gernot Becker, Dormagen, Fed. Rep. of Germany

[73] Assignee: Bayer Aktiengesellschaft, Bayerwerk, Fed. Rep. of Germany

[21] Appl. No.: 239,247

[22] Filed: Mar. 2, 1981

[30] Foreign Application Priority Data

Mar. 28, 1980 [DE] Fed. Rep. of Germany ....... 3012001

[51] Int. Cl.[3] .......................... C07H 3/04; C09K 3/00
[52] U.S. Cl. .................................. 252/182; 536/18.3; 536/120; 568/620
[58] Field of Search ........................ 252/182; 568/620; 536/18.3, 120

[56] References Cited

U.S. PATENT DOCUMENTS

| | | | |
|---|---|---|---|
| 2,652,394 | 9/1953 | Groote | 260/209 |
| 2,990,376 | 6/1961 | Bressler et al. | 252/182 |
| 3,055,085 | 9/1962 | Mayne | 29/156.8 |
| 3,085,085 | 4/1963 | Wismer | 260/209 |
| 3,153,002 | 10/1964 | Wismer | 260/2.5 |
| 3,277,070 | 10/1966 | Yatsuzuka | 536/18.3 |
| 3,305,535 | 2/1967 | Merten et al. | 260/77.5 |
| 3,442,888 | 5/1969 | Degginger et al. | 260/209 |
| 3,449,318 | 6/1969 | Roth et al. | 536/18.3 |
| 4,187,355 | 2/1980 | Wagner | 521/158 |

FOREIGN PATENT DOCUMENTS

| | | | |
|---|---|---|---|
| 743155 | 9/1966 | Canada | 400/5 |
| 1443022 | 5/1970 | Fed. Rep. of Germany . | |
| 2269550 | 11/1976 | France . | |
| 136833 | 1/1979 | German Democratic Rep. | 568/620 |
| 955488 | 4/1961 | United Kingdom . | |
| 1553543 | 9/1979 | United Kingdom . | |

OTHER PUBLICATIONS

Journal of Organic Chemistry, vol. 13, 1948, pp. 782–784, J. W. LeMaistre & Raymond B. Seymour, Reaction of Sucrose with Ethylene Oxide.

*Primary Examiner*—Allan Lieberman
*Attorney, Agent, or Firm*—Gene Harsh; Joseph C. Gil; Lyndanne M. Whalen

[57] ABSTRACT

Polyether polyols are made by alkoxylating a mixture which is from 20–80 weight % sucrose and 80–20 weight % formitol. The product polyether polyols have an average hydroxyl functionality of at least 3 and a hydroxyl number of from 28 to 1000. These polyether polyols are particularly useful for the production of rigid polyurethane foams.

6 Claims, No Drawings

PROCESS FOR THE PRODUCTION OF POLYETHER POLYOLS

BACKGROUND OF THE INVENTION

The present invention relates to novel polyether polyols based on sucrose and formitol. These polyols have a relatively low viscosity and are particularly suitable for the production of rigid, closed-cell polyurethane foams.

Rigid, closed-cell polyurethane foams are generally obtained by reacting a polyether polyol with an aromatic polyisocyanate, such as crude 4,4'-diisocyanato diphenyl methane. Such polyurethane foams are particularly suitable for the production of insulating materials, sandwich structures, building panels and numerous other building elements.

The physical and mechanical characteristics of these foamed plastics depend to a large extent upon the structure and molecular size of the polyethers which are used. Polyethers derived from trihydric alcohols, such as trimethylol propane or glycerin, have been used to make such rigid foams. However, polyurethane foams obtained from such polyethers have poor dimensional stability. Increasing the amount of cross-linking may improve the quality of such rigid polyurethane foams; however, the thus-obtained products are still unsatisfactory.

One approach to improving rigid polyurethane foams which has been investigated is the use of high-functional polyether polyols based on sucrose. However, these efforts have not been too successful due to the number of technical problems encountered with conventional processes for producing sucrose polyether.

It is known to react sucrose with alkylene oxide in an aqueous solution in the presence of sodium hydroxide and ethylene oxide and subsequently convert the product into sucrose hydroxy alkyl ethers (J. W. LeMaistre R. B. Seymour, J. Org. Chem. 13,782 (1948)). In one process based on this reaction, sucrose is reacted at elevated temperatures with ethylene oxide or propylene oxide in a concentrated aqueous solution in the presence of a potassium hydroxide catalyst (U.S. Pat. Nos. 3,055,085 and 3,153,002; German Pat. No. 1,443,026). However, such processes are subject to undesirable secondary reactions, such as partial hydrolysis of the alkylene oxide by the water used as the reaction medium. When such hydrolyzed alkylene oxides are used to form polyalkylene glycols, the reaction mixture becomes very darkly colored. This dark coloring has a disadvantageous effect upon the properties of polyurethane foams which are produced from these sucrose hydroxy alkyl ethers. These secondary reactions also result in a large amount of bifunctional, linear by-products which reduce the functionality of the product polyethers (as compared to the functionality of a pure sucrose polyol). As a result of the large proportion of such by-products, the product sucrose polyethers have limited suitability for the production of satisfactory polyurethane foams. In fact, such by-product laden polyethers tend to yield brittle foams of moderate strength having a non-uniform cell structure. Another disadvantage of polyurethane foams obtained from such sucrose polyethers is the low proportion of closed cells and consequent poor heat insulation ability.

For these reasons, it has been attempted to alkoxylate sucrose in the presence of xylene (U.S. Pat. No. 2,652,394) rather than water. However, this process yields highly discolored products as a result of converting the sucrose into caramel or carbonizing the sucrose.

It has been found that the production of large quantities of bifunctional by-products may be reduced by a process wherein sucrose is first reacted with from 4 to 8 mols alkylene oxide in a concentrated, aqueous solution in the presence of potash lye. Substantially all of the water is then removed from the reaction mixture and more alkylene oxide is added (German Pat. No. 1,443,022). However, since a large quantity of the alkylene oxide is reacted in the presence of relatively large amounts of water, the disadvantages already mentioned with respect to the process of alkoxylation without dehydration, also occur to a considerable extent in this process. One of the disadvantages of these known processes which employ an aqueous solution is that most of the sugar must be added at temperatures which are approximately the same as the boiling point of water or only slightly below. Another disadvantage of such processes is that the rate of the alkylene oxide addition reaction is relatively slow which greatly promotes the formation of by-products.

The combination of the required characteristics for rigid polyurethane foams (i.e. a fine cell feature, dimensional stability in moist heat and at cold temperatures) with outstanding flow behavior in the foaming process and the required curing behavior (particularly curing rate and formation of a hard peripheral area with an optimum adhesion to covering layers), cannot be achieved by using either known polyether polyols based on sucrose or sucrose glycerin mixtures or sorbitol as the starting material.

U.S. Pat. No. 2,990,376 discloses that a polyol which is suitable for the production of rigid polyurethane foams is obtained if small amounts of a particular sucrose polyether are added to a glycerin polyether. Another process for the production of rigid polyurethane plastics is suggested in German Auslegeschrift No. 1,285,741. In this process, polyethers which contain a carefully controlled ratio of sucrose and glycerin are used. The foams obtained from either of these polyethers do exhibit a good dimensional stability, but do not have the other required characteristics of a suitable rigid polyurethane foam (particularly short in-mold times and the ability to form hard surfaces with outstanding adhesion to covering layers). Additionally, use of relatively expensive glycerin as the starting material for polyethers is economically impractical.

German Offenlegungsschrift No. 2,639,083 discloses a method for the preparation and use of formitol-polyethers. Polyethers which are prepared according to this process are advantageously distinguished from sucrose polyethers and glycerin-started polyethers, particularly by improved flowability. However, when used in the production of polyurethane foams, they do not possess all of the above-mentioned desirable characteristics (see Comparative Examples 10 to 16 infra).

SUMMARY OF THE INVENTION

It is an object of the present invention to provide a process for the preparation of polyether polyols in a commercially simple manner, which polyols may be processed into rigid polyurethane foams.

It is another object of the invention to provide a process for the preparation of polyether polyols which may be processed into rigid polyurethane foams which have a small cell structure and good dimensional stability both in moist heat and at cold temperatures.

It is a further object of the present invention to provide a process for the preparation of polyether polyols which may be used to make a foam mixture having good flow and curing properties.

These and other objects which will be apparent to those in the art are achieved by alkoxylating a mixture of sucrose and formitol to produce a polyether polyol having an average hydroxyl functionality of at least three and a hydroxyl number of from 28 to 1000. The mixture which is alkoxylated comprises (a) 20–80 weight % sucrose and (b) 80–20 weight % formitol having an average hydroxyl functionality of at least three. The formitol employed may be obtained by the reduction of mixtures of hydroxy aldehydes and hydroxy ketones ("formose") which are obtained by the auto-condensation of formaldehyde hydrate in the presence of metal compound catalysts and co-catalysts which are capable of enediol formation. (See e.g. German Offenlegungsschrift Nos. 2,639,083; 2,639,084; 2,714,084; 2,714,104; 2,721,186; 2,721,093; 2,732,077; 2,738,154; 2,738,512; 2,756,270; 2,808,228 and 2,831,659).

DETAILED DESCRIPTION OF THE INVENTION

The present invention relates to a process for the production of polyether polyols having an average hydroxyl functionality of at least 3, preferably from 4 to 7, and a hydroxyl number of from 28 to 1000, preferably from 200 to 800, most preferably from 300 to 600. These polyether polyols are prepared by alkoxylating a starting mixture of sucrose, a low molecular weight polyol and optionally, water. This starting material is a mixture comprising:

(a) from 20 to 80% by weight, preferably from 40 to 75% by weight sucrose (based on the total weight of sucrose and formitol) and (b) from 80 to 20% by weight, preferably from 60 to 25%, by weight of formitol (based on the total weight of sucrose and formitol) having an average hydroxyl functionality of at least 3, preferably from 3.3 to 5.7.

As mentioned above, the formitols which are suitable for the process of the present invention may be obtained in known manner by the reduction (generally by hydrogenation) of formose. These formitols are mixtures of polyhydric alcohols which may be represented by the general formula:

$$C_nH_{2n+2}O_n$$

wherein n represents an integer $\geqq 2$ (traces of polyols wherein $n > 10$ may be detected in the formitol) and has an average value of at least 3 (generally from 3 to 6, preferably from 3.3 to 5.7).

These formitols typically have compositions within the following ranges:

n=2: from 0.1 to 40%, by weight, preferably from 1 to 15%, by weight;
n=3: from 0.2 to 30%, by weight, preferably from 3 to 27%, by weight;
n=4: from 0.2 to 40%, by weight, preferably from 6 to 30%, by weight;
n=5: from 1.0 to 40%, by weight, preferably from 6 to 35%, by weight;
n=6: from 0.1 to 50%, by weight, preferably from 5 to 40%, by weight;
n=7: from 0.1 to 50%, by weight, preferably from 2 to 25% by weight.

In the process of the present invention, the starting material preferably also contains water in a quantity of from 0.5 to 3 parts by weight (based on 100 parts of sucrose and formitol).

According to the present invention, it is also preferred for the starting material to contain from 2 to 20 parts by weight (based on 100 parts of sucrose and formitol), of a low molecular weight polyhydric alcohol and/or monoamine and/or polyamine.

The present invention also relates to the use of sucrose/formitol polyalkylene glycol polyethers in making rigid polyurethane foams. These polyethers are reacted with polyisocyanates according to known processes to produce rigid polyurethane foams having a high surface hardness and short in-mold times.

The process according to the present invention is preferably carried out by mixing sucrose with formitol in the required weight ratios and then suspending the mixture in an aromatic hydrocarbon solvent at room temperature. The hydrocarbon solvent may be used in a quantity which constitutes from 40 to 150%, preferably from 50 to 100% by weight of the starting material. Under a nitrogen atmosphere, optionally a small quantity (as compared with the quantity of the sugar/formitol mixture) of a water-soluble, short-chain polyol, monoamine or polyamine, and/or a small quantity of water and a small quantity of an alkali metal hydroxide catalyst may be added in any sequence to this sucrose-formitol suspension at temperatures of from 20° to 110° C., preferably from 50° to 90° C. The alkali metal hydroxide used is preferably in the form of a concentrated aqueous lye. The thus-obtained stirrable, pulpy mixture is then heated to the reaction temperature of from 85° to 130° C., preferably from 95° to 115° C., and subsequently reacted with the alkylene oxide at pressures of from 0.3 to 4.0 bars, preferably from 0.5 to 2.5 bars.

The reaction temperature should be maintained at from 85° to 130° C., preferably from 95° to 115° C., by heating or cooling the reaction mixture as required. When all of the alkylene oxide has been added, the alkaline polymer may be neutralized with dilute mineral acid. An antioxidant, such as 2,6-di-t-butyl-p-cresol may then be added to the neutralized product. Water and hydrocarbon may be distilled off under vacuum at a temperature of from about 50° to 130° C., except for a small residual content. The salts which are separated by this process may be removed by filtration.

In the process of the present invention, various aromatic hydrocarbon solvents having a boiling point of from 80° to 180° C. may be used. Solvents of this type include benzene, toluene, ethyl benzene, xylenes and chlorobenzene. Toluene is the preferred solvent. The aromatic hydrocarbons may also be used in the form of a mixture with aliphatic solvents which have a boiling point of from 80° to 180° C.

The polyols, mono- and/or poly-amines which may optionally also be used in the process of the present invention are preferably water-soluble compounds melting below 100° C. and generally have a molecular weight of from 60 to 250. Examples of such compounds include: ethylene glycol; propylene glycol; butane diol-1,4; diethylene glycol; dipropylene glycol; trimethylol propane; glycerin; sorbitol; mannitol; mono-, di- and tri-ethanolamine; mono-, di- and tri-isopropanolamine;

N-alkyl-alkanolamines, such as N-methyl-diethanolamine and N-ethyl-diethanolamine; lower aliphatic mono- and di-alkylamines; cycloalkylamines; aralkylamines; alkylene diamines, such as ethylene diamine; and polyalkylene polyamines, such as diethylene triamine and triethylene tetramine. Ethylene glycol, propylene glycol or amino-alcohols are preferably used in the process according to the present invention. Mixtures of two or more of these additives may also be used. Whether a single additive or a mixture of additives is used, however, the total quantity of the additives should be from 2 to 20%, preferably from 3 to 15% (based on the total weight of the sucrose/formitol).

The water content of the mixture of sucrose/formitol, additives and catalysts according to the present invention should preferably be from 0.5 to 3%, most preferably from 0.6 to 2%, of the weight of the sucrose/formitol mixture.

The alkylene oxide should preferably be reacted with the sucrose/formitol suspension in the presence of an alkali metal hydroxide catalyst. Sodium hydroxide and potassium hydroxide are preferred catalysts. In one preferred embodiment, potassium hydroxide may be used as an approximately 50% aqueous solution in an amount such that the quantity of potassium hydroxide is from 1.0 to 5.0% (preferably from 2.0 to 3.0%) of the weight of the sucrose/formitol suspension.

In the process according to the present invention, ethylene oxide, propylene oxide and/or 1,2-butylene oxide are the preferred alkylene oxides. This alkoxylation reaction may be carried out using the mentioned alkylene oxides singly or as mixtures. It is also possible in the process of the present invention to use successively different alkylene oxides in the reaction mixture to prepare "block copolyethers".

The reaction temperature may be varied over a comparatively wide range, although the process is generally carried out at from 85° to 130° C., preferably from 95° to 115° C. The alkylene oxides should be reacted with the sucrose/formitol mixture at elevated pressure (generally from 0.3 to 4.0 bars, preferably from 0.5 to 2.5 bars).

In preparing polyethers according to the present invention, the quantity of alkylene oxide used should generally be selected so that each starter molecule is reacted, on average, with from about 4 to 20 (preferably from about 8 to 15) molecules of the alkylene oxide. The thus-obtained polyethers generally have hydroxyl numbers of from 200 to 800, preferably from 300 to 600.

The polyether polyols according to the present invention surprisingly produce outstanding mechanical characteristics in polyurethane plastics (particularly surface hardness for rigid foams). Highly functional polyethers may only be prepared from sugar/polyol mixtures (if at all) by means of conventional processes, however, at considerable technical expense. Polyethers prepared by the prior art processes are generally highly viscous and brown colored due to the by-product content.

In contrast, the polyethers prepared according to the present invention range from clear to yellowish, and may be watery or viscous. According to the hydroxyl number and additive content, the viscosity of the product may be from 300 to 36,000 mPas/25° C. (at low hydroxyl numbers of approximately 350) or from 1000 to 1,000,000 mPas/25° C. (at higher hydroxyl numbers approximating 550). By varying the hydroxyl number and the quantity of additives, (and to a lesser extent by varying the small amount of water), products may be obtained which have a viscosity adapted to the intended application.

The sucrose/formitol polyethers obtained according to the present invention are particularly valuable starting materials for the production of rigid polyurethane foams. Such foams may be made in accordance with known processes by reacting an isocyanate (preferably an aromatic polyisocyanate) in the presence of conventional auxiliary agents and additives. The thus-obtained foams possess a combination of physical properties which are particularly advantageous.

Polyisocyanates which are suitable for the production of polyurethanes according to the present invention, optional higher molecular weight and/or low molecular weight compounds, optional activators, stabilizers, blowing agents and other known additives may be found in the above-mentioned references and also in German Offenlegungsschrift Nos. 2,738,513; 2,738,532 and 2,738,533.

Having thus described our invention, the following Examples are given by way of illustration. Unless otherwise indicated all amounts are given in part by weight or percent by weight.

In carrying out the alkoxylation reactions of the following Examples, an autoclave which was equipped with a heating and cooling device, a stirring apparatus, an apparatus to expel the air by means of nitrogen gas (e.g. a vacuum connection and a nitrogen supply) and a device to meter the alkylene oxide was used.

EXAMPLES

EXAMPLE 1

640 g of a formitol having composition:

dihydric alcohols: 6.88%, by weight
trihydric alcohols: 23.55%, by weight
tetrahydric alcohols: 22.9%, by weight
pentahydric alcohols: 16.6%, by weight
hexahydric alcohols: 18.08%, by weight
heptahydric alcohols and higher polyhydric alcohols: 11.99%, by weight
(average hydroxyl functionality: 4.01)

and 1208 g of sucrose were introduced into 600 g of toluene at room temperature.

By twice flushing the reaction vessel with nitrogen, the atmospheric oxygen was removed. After heating the sucrose/formitol suspension to 80° C., 67 g of 50% aqueous potash lye were added. The mixture was then re-heated. At from 100° to 110° C., 4139 g of propylene oxide were gradually metered into the stirrable mixture at a pressure of from 0.4 to 0.6 bars. The reaction temperature was maintained by cooling or heating as required. After all the propylene oxide has been added, the mixture was stirred for another 3 hours at from 100° to 110° C. After adding 600 g of water and 201 g of 12.6% aqueous sulphuric acid, the alcoholic polymer was neutralized. After adding filtration aids (cellulose powder and synthetic magnesium silicate) and an anti-oxidant (2,6-di-t-butyl-p-cresol) the water was then distilled off under vacuum at from 70° to 90° C. At a water content of 0.9%, the separated salts and the filtration aids were filtered off. In order completely to remove the water, the filtrate was then distilled under vacuum at from 100° to 105° C.

The product which was obtained had the following properties:

Hydroxyl number (mg KOH/g): 449
pH: 8.7
Water content (%): 0.1
Viscosity at 25° C. (mPas): 27,400
Average hydroxyl functionality: 5.0

The hydroxyl numbers which are stated in the Examples were obtained by acylating the polyether with excess phthalic acid anhydride and pyridine in the usual manner.

In determining the pH, a mixture of methanol and water in a volume ratio of 9:1 was used as the solvent. For the pH measurement, 10 ml of the polyether and 100 ml of the solvent were used. The pH was measured by means of a single-rod glass electrode.

EXAMPLE 2

A polyether was prepared from the following materials according to the process described in Example 1:

764 g of the formitol from Example 1
960.3 g of sucrose
600 g of toluene
68.4 g of 50% aqueous potash lye
4276 g of propylene oxide The product which was obtained had the following properties:

Hydroxyl number (mg KOH/g): 441
pH: 8.1
Water content (%): 0.08
Viscosity at 25° C. (mPas): 14,800
Average hydroxyl functionality: 4.7

EXAMPLE 3

480 g of formitol from Example 1, 1208 g of sucrose, 179 g of propylene glycol and 600 g of toluene were introduced into the reaction vessel at room temperature. By twice flushing the reaction vessel with nitrogen, the atmospheric oxygen was removed. After heating to 80° C., 65.3 g of 50% aqueous potash lye were added. The stirrable mixture was heated to 100° C. and 4133 g of propylene oxide were gradually metered in at a pressure of from 0.4 to 0.6 bars and a temperature of from 100° to 110° C. The course of the reaction and subsequent working-up of the reaction mixture were substantially the same as in Example 1.

The product which was obtained had the following properties:

Hydroxyl number (mg KOH/g): 416
pH: 9.3
Water content (%): 0.05
Viscosity at 25° C. (mPas): 16,100
Average hydroxyl functionality: 4.5

EXAMPLE 4

A polyether was prepared from the materials described below according to the process as described in Example 1.

676 g of a formitol having the composition:

dihydric alcohols: 37%, by weight
trihydric alcohols: 17%, by weight
tetrahydric alcohols: 16%, by weight
pentahydric alcohols: 12%, by weight
hexahydric alcohols: 13%, by weight
heptahydric alcohols and higher polyhydric alcohols: 5%, by weight
(average hydroxyl functionality: 3), 1208 g of sucrose, 700 g of toluene, 60 g of 50% aqueous potash lye and 4124 g of propylene oxide.

The product which was obtained had the following properties:

Hydroxyl number (mg KOH/g): 425
pH: 7.2
Water content (%): 0.03
Viscosity at 25° C. (mPas): 11,400
Average hydroxyl functionality: 4.3

In Examples 5 to 19, in addition to the polyethers according to the present invention which were started on sucrose/formitol, the following conventional polyethers were used:

Polyether A

Addition product of propylene oxide to a formitol of the following composition:

dihydric alcohols: 1%, by weight
trihydric alcohols: 4%, by weight
tetrahydric alcohols: 8%, by weight
pentahydric alcohols: 34%, by weight
hexahydric alcohols: 38%, by weight
heptahydric and higher polyhydric alcohols: 15%, by weight
(average hydroxyl functionality: 5.2).

Propoxylation took place according to the process described in German Offenlegungsschrift No. 2,639,083. Hydroxyl number of the polyether: 550.

Polyether B

Addition product of propylene oxide to a mixture of 1881 g of sucrose, 1900 g of 1,2-propylene glycol and 36 g of water. Hydroxyl number: 370; average hydroxyl functionality: 3.

Propoxylation of the above starting mixture took place according to the process described in U.S. Pat. No. 3,941,769.

Polyether C

Addition product of propylene oxide to a formitol of the following composition:

dihydric alcohols: 36.6%, by weight
trihydric alcohols: 16.4%, by weight
tetrahydric alcohols: 16.2%, by weight
pentahydric alcohols: 12.6%, by weight
hexahydric alcohols: 12.8%, by weight
heptahydric and higher polyhydric alcohols: 5.4%, by weight
(average hydroxyl functionality: 3)

Propoxylation took place according to the process described in German Offenlegungsschrift No. 2,639,083.

Hydroxyl number of the polyether: 405.
Average hydroxyl functionality: 3.

Polyether D

Addition product of propylene oxide to a mixture of sucrose and glycerine, prepared according to the process described in U.S. Pat. No. 3,941,769.

Hydroxyl number: 400.

Average hydroxyl functionality: 4.2.

Polyether E

Analogous to polyether D; started on a mixture of sucrose and glycerin.

Hydroxyl number: 380.

Average hydroxyl functionality: 4.5.

Polyether F

Addition product of propylene oxide to a mixture of sucrose and 1,2-propylene glycol; prepared by a process analogous to that used in making polyether D.

Hydroxyl number: 430.

Average hydroxyl functionality: 4.1

Polyether G

Analogous to polyether D, started on a mixture of sucrose and glycerin.

Hydroxyl number: 480.

Average hydroxyl functionality: 5.1.

Polyether H

Propoxylated diethylene triamine; hyroxyl number: 440.

Polyether I

Addition product of propylene oxide to a mixture of sorbitol and 1,2-propylene glycol, prepared by a process analogous to that of Example 1 in German Offenlegungsschrift No. 2,519,449.

Hydroxyl number: 450

Average hydroxyl functionality: 2.8.

Polyether J

Propoxylated 2,4-toluylene diamine; hydroxyl number: 370.

EXAMPLE 5

95 g of the polyether polyol of Example 4, 1.5 g of water, 2 g of a foam stabilizer (according to German Offenlegungsschrift No. 2,029,293), 3 g of dimethyl cyclohexylamine and 38 g of a fluorochlorohydrocarbon (as the blowing agent) were mixed.

This mixture was thoroughly mixed with 129 g of crude 4,4'-diisocyanatodiphenylmethane (obtained by phosgenating a commercial aniline/formaldehyde condensate and having an NCO-content of 31%). The mixture was then charged into one of the molds described below.

1. Paper (test-) packet of dimensions 20×20×14 cm to determine the starting and setting times, the free bulk density and also the surface brittleness when the foamed plastic had cured.

2. A panel mold of dimensions 22×22×6 cm, in which sandwich panels with 1 mm thick sheet steel covering layers were foamed to determine the minimum in-mold time. The term "minimum in-mold time" designates the time during which the panel must remain in a previously heated mold so that it does not have any thickness swellings 30 minutes after being removed from the mold. From the measured data a collective determination of the essential properties of such foams (surface-brittleness, adhesiveness and "minimum in-mold-time"), made of the polyether polyol and optionally the polyether polyol combination was made. The results obtained are presented in Table 1 below together with those from Examples 6 to 9 (according to the present invention) and Comparative Examples 10 to 19. The surface brittleness was determined according to the following codes:

1=surface does not become brittle

2=surface only becomes brittle for a period of 15 minutes

3=the surface becomes brittle for a period of 15-60 minutes

4=the surface remains brittle for more than 60 minutes

EXAMPLE 6

95 g of the polyether of Example 1, 1.5 g of water, 2 g of a foam stabilizer (according to German Offenlegungsschrift No. 2,029,293). 3.4 g of dimethyl cyclohexylamine and 38 g of a fluorochlorohydrocarbon (as the blowing agent) were mixed.

This mixture was foamed with 141 g of crude 4,4'-diisocyanatodiphenylmethane under the conditions indicated in Example 5. The resulting foams were tested and judged in a manner analogous to that of Example 5.

EXAMPLE 7

95 g of the polyether of Example 2, 1.5 g of water, 2 g of a foam stabilizer (according to German Offenlegungsschrift No. 2,029,293), 3.4 g of dimethyl cyclohexylamine and 38 g of a fluorochlorohydrocarbon (as the blowing agent) were mixed.

This mixture was foamed with 139 g of crude 4,4'-diisocyanatodiphenylmethane under the same conditions as Example 5. The resulting foams are tested and judged analogously to Example 5.

EXAMPLE 8

95 g of the polyether of Example 3, 1.5 g of water, 2 g of a foam stabilizer (according to German Offenlegungsschrift No. 2,029,293), 2.8 g of dimethyl cyclohexylamine and 38 g of a fluorochlorohydrocarbon (as a blowing agent) were mixed.

This mixture was foamed with 131 g of a crude 4,4'-diisocyanatodiphenylmethane under the same conditions used in Example 5. The resulting foams were tested and judged analogously to Example 5.

EXAMPLE 9

95 g of the polyether polyol of Example 4, 2.4 g of water, 2.0 g of foam stabilizer (according to German Offenlegungsschrift No. 2,029,293), 2.6 g of dimethyl cyclohexylamine and 35 g of a fluorochlorohydrocarbon (as the blowing agent) were mixed.

This mixture was foamed with 142 g of crude 4,4'-diisocyanatodiphenylmethane under the same conditions as were used in Example 5. The resulting foams were tested and judged analogously to Example 5.

EXAMPLE 10 (Comparative Example)

47.5 g of polyether A, 47.5 g of polyether B, 1.5 g of water, 2 g of a foam stabilizer (according to German Offenlegungsschrift No. 2,029,293), 3 g of dimethyl cyclohexylamine and 38 g of fluorochlorohydrocarbon (as the blowing agent) were mixed.

This mixture was foamed with 139 g of crude 4,4'-diisocyanatodiphenylmethane under the conditions used in Example 5. The resulting foams were tested and judged analogously to Example 5. The physical properties of this foam were poorer than those made with the polyether polyols according to the present invention as can be seen from Table 1. The greater surface brittleness of the foam produced is particularly disadvantageous.

EXAMPLE 11 (Comparative Example)

47.5 g of polyether polyol A, 47.5 g of polyether polyol B, 1.5 g of water, 2 g of a foam stabilizer (according to German Offenlegungsschrift No. 2,029,293), 0.5 g of N, N, N', N'', N''-pentamethyl diethylene triamine, 2 g of dimethyl cyclohexylamine and 38 g of a fluorochlorohydrocarbon (as the blowing agent) were mixed.

This mixture was foamed with 139 g of crude 4,4'-diisocyanatodiphenylmethane under the same conditions as were used in Example 5. The resulting foams were tested and judged analogously to Example 5. The inferiority of this foam (in comparison with foam made from polyether polyols according to the present invention) may be seen from the data in Table 1. The coarser cell structure of this product is also disadvantageous.

EXAMPLE 12 (Comparative Example)

47.5 g of polyether A, 47.5 g of polyether C, 1.5 g of water, 2 g of foam stabilizer (according to German Offenlegungsschrift No. 2,029,293), 2.9 g of dimethyl cyclohexylamine and 38 g of a fluorochlorohydrocarbon (as the blowing agent) were mixed.

This mixture was foamed with 142 g of crude 4,4'-diisocyanatodiphenylmethane under the same conditions used in Example 5. The resulting foams were tested and judged analogously to Example 5. The inferiority of this product with respect to foams made with polyether polyols of the present invention may be appreciated by examination of Table 1. The coarse cell structure of this product is disadvantageous.

EXAMPLE 13 (Comparative Example)

47.5 g of polyether A, 47.5 g of polyether C, 2 g of water, 2 g of a foam stabilizer (according to German Offenlegungsschrift No. 2,029,293), 2.6 g of dimethyl cyclohexylamine and 35 g of a fluorochlorohydrocarbon (as the blowing agent) were mixed.

This mixture was foamed with 142 g of crude 4,4'-diioscyanatodiphenylmethane under the conditions used in Example 5. The resulting foams were tested and judged analogously to Example 5. The inferiority of this product as compared to foams made with polyether polyols of the present invention may be seen from the data of Table 1. The greater surface brittleness of the resultant foam is particularly disadvantageous.

EXAMPLE 14 (Comparative Example)

95 g of polyether D, 1.5 g of a foam stabilizer (according to German Offenlegungsschrift No. 2,029,293), 1.4 g of water, 0.5 g of N,N,N',N'',N''-pentamethyl diethylene triamine, 1.5 g of dimethyl cyclohexylamine and 38 g of a fluorochlorohydrocarbon (as the blowing agent) were mixed.

This mixture was foamed with 130 g of crude 4,4'-diisocyanatodiphenylmethane under the same conditions used in Example 5. The resulting foams were tested and judged analogously to Example 5. The inferiority of this product as compared to foams made from the polyether polyols of the present invention may be seen from Table 1. The longer in-mold time is particularly disadvantageous.

EXAMPLE 15 (Comparative Example)

95 g of polyether E, 2.1 g of water, 1.5 g of a foam stabilizer (according to German Offenlegungsschrift No. 2,029,293), 3.5 g of dimethyl cyclohexylamine and 38 g of a fluorochlorohydrocarbon (as the blowing agent) were mixed.

This mixture was foamed with 140 g of crude 4,4'-diisocyanatodiphenylmethane under the same conditions used in Example 5. The resulting foams were tested and judged analogously to Example 5. The inferiority of this foam as compared to foams made with the polyether polyols of the present invention may be seen from the details presented in Table 1. The high amine quantity and also the longer in-mold time of this foam are particularly disadvantageous.

EXAMPLE 16 (Comparative Example)

95 g of polyether F, 2.1 g of water, 1.9 g of a foam stabilizer (according to German Offenlegungsschrift No. 2,029,293), 0.7 g of N, N, N', N'', N''-pentamethyl diethylene triamine and 36 g of a fluorochlorohydrocarbon (as the blowing agent) were mixed.

This mixture was foamed with 150 g of crude 4,4'-diisocyanatodiphenylmethane as previously described. The resulting foams were tested and judged analogously to Example 5. The inferiority of the product foam as compared to foams made with the polyether polyols according to the present invention may be seen from Table 1. The surface of the foamed plastics which is brittle for a longer time and also the poor adhesion to the covering layers are particularly disadvantageous.

EXAMPLE 17 (Comparative Example)

75 g of polyether G, 20 g of polyether H, 1.5 g of water, 1.5 g of a foam stabilizer (according to German Offenlegungsschrift No. 2,029,293), 0.6 g of dimethyl ethanolamine, 0.9 g of N,N,N',N'',N''-pentamethyl diethylene triamine, 1.2 g of dimethyl cyclohexylamine and 38 g of fluorochlorohydrocarbon (as the blowing agent) were mixed.

This mixture was foamed with 133 g of crude 4,4'-diisocyanatodiphenylmethane under the above described conditions. The resulting foams were tested and judged analogously to Example 5. The inferiority of this foam as compared to foams made with the polyether polyols of the present invention may be seen from the details of Table 1. The surface which was brittle for a longer time and the long in-mold time are particularly disadvantageous.

EXAMPLE 18 (Comparative Example)

75 g of polyether I, 20 g of polyether J, 2 g of water, 1.5 g of a foam stabilizer (according to German Offenlegungsschrift No. 2,029,293), 2 g of dimethyl cyclohexylamine and 35 g of fluorochlorohydrocarbon (as the blowing agent) were mixed.

This mixture was foamed with 140 g of crude 4,4'-diisocyanatodiphenylmethane under the conditions described above. The resulting foams were tested and judged analogously to Example 5. The inferiority of of this product as compared to foams made from the polyether polyols of the present invention may be seen from Table 1. The surface of the foamed plastics which was brittle for a long period of time and the longer in-mold time are particularly disadvantageous.

EXAMPLE 19 (Comparative Example)

95 g of polyether I, 1.9 g of water, 1.5 g of foam stabilizer (according to German Offenlegungsschrift No. 2,029,293), 2.5 g of dimethyl cyclohexylamine and 33 g of fluorochlorohydrocarbon (as the blowing agent) were mixed.

This mixture was foamed with 145 g of crude 4,4'-diisocyanatodiphenylmethane under the above-described conditions. The resulting foams were tested and judged analogously to Example 5. The inferiority of this product as compared to foams made with the polyether polyols of the present invention may be seen from the data of Table 1. The longer in-mold time is particularly disadvantageous.

TABLE 1

| | According to the Present Invention | | | | | Comparative Examples | | | | | | | | | |
|---|---|---|---|---|---|---|---|---|---|---|---|---|---|---|---|
| Example | 5 | 6 | 7 | 8 | 9 | 10 | 11 | 12 | 13 | 14 | 15 | 16 | 17 | 18 | 19 |
| 1. Test packet | | | | | | | | | | | | | | | |
| Starting time (sec) | 18 | 19 | 18 | 18 | 18 | 20 | 13 | 22 | 20 | 9 | 14 | 10 | 11 | 15 | 15 |
| Setting time (sec) | 100 | 102 | 99 | 102 | 100 | 100 | 100 | 100 | 100 | 100 | 100 | 100 | 80 | 100 | 90 |
| Free bulk density ($KG/m^3$) DIN 53420 | 22.0 | 23.6 | 22.8 | 23.4 | 21.2 | 22.1 | 21.5 | 21.6 | 22.1 | 22.4 | 21.2 | 22.0 | 21.9 | 20.5 | 25.0 |
| Surface brittleness | 1 | 1 | 1 | 1 | 1 | 2 | 1 | 1 | 2 | 3 | 1 | 4 | 3 | 2 | 3 |
| Adhesiveness | 0.28 | 0.29 | 0.29 | 0.28 | 0.27 | 0.21 | 0.23 | 0.24 | 0.22 | 0.19 | 0.20 | 0.15 | 0.18 | 0.17 | 0.18 |
| 2. Panel Mold | | | | | | | | | | | | | | | |
| Minimum in-mold time (min) | 4 | 4 | 4 | 4 | 4 | 4.5 | 4.5 | 4.5 | 4.5 | 5.5 | 5.5 | 5 | 5 | 5.5 | 5 |

What is claimed is:

1. A process for the production of polyether polyols having an average hydroxyl functionality of at least 3 and a hydroxyl number of from 28 to 1000 by alkoxylating a mixture comprising:

(a) from 20 to 80% by weight of sucrose (based on the sum of (a) and (b)), and (b) from 80 to 20% by weight of formitol having an average hydroxyl functionality of at least 3 (based on the sum of (a) and (b)).

2. The process of claim 1 wherein the mixture comprises:

(a) from 40 to 75% by weight of sucrose (based on the sum of (a) and (b)), and (b) from 60 to 25% by weight of formitol (based on the sum of (a) and (b)).

3. The process of claim 1 wherein the formitol has an average hydroxyl functionality of from 3.3 to 5.7.

4. The process of claim 1 wherein the mixture further comprises 0.5 to 3% by weight water (based on the total quantity of sucrose and formitol).

5. The process of claim 1 wherein the mixture further comprises 2–20% by weight of a compound taken from the group consisting of a low molecular weight polyol, mono-amine, poly-amine and mixtures thereof (based on the total quantity of sucrose and formitol).

6. The process of claim 1 wherein the mixture has an average functionality with respect to alkylene oxides of from 4 to 7.

* * * * *